(12) United States Patent
Hipsky

(10) Patent No.: US 8,863,548 B2
(45) Date of Patent: Oct. 21, 2014

(54) CABIN AIR COMPRESSOR MOTOR COOLING

(75) Inventor: Harold W. Hipsky, Willington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 549 days.

(21) Appl. No.: 12/838,078

(22) Filed: Jul. 16, 2010

(65) Prior Publication Data

US 2012/0011878 A1 Jan. 19, 2012

(51) Int. Cl.
*F25D 9/00* (2006.01)
*B64D 13/06* (2006.01)
*F04D 29/58* (2006.01)

(52) U.S. Cl.
CPC .............. *B64D 13/06* (2013.01); *F04D 29/584* (2013.01); *F04D 29/5806* (2013.01)
USPC .............................................. 62/401; 62/505

(58) Field of Classification Search
CPC ....... F25B 9/004; F25B 9/06; F25B 2309/005
USPC ...................... 62/505, 401, 402, 86
See application file for complete search history.

(56) References Cited

U.S. PATENT DOCUMENTS

| | | | |
|---|---|---|---|
| 3,728,857 A * | 4/1973 | Nichols | 62/469 |
| 5,791,871 A | 8/1998 | Sech et al. | |
| 6,164,084 A * | 12/2000 | Watson et al. | 62/402 |
| 6,681,592 B1 | 1/2004 | Lents et al. | |
| 6,684,660 B1 | 2/2004 | Bruno et al. | |
| 6,928,832 B2 | 8/2005 | Lents et al. | |
| 7,074,010 B2 | 7/2006 | DeGroff et al. | |
| 7,302,804 B2 | 12/2007 | Murry et al. | |
| 7,305,842 B1 | 12/2007 | Schiff | |
| 7,322,202 B2 | 1/2008 | Zywiak et al. | |
| 7,334,422 B2 | 2/2008 | Zywiak et al. | |
| 7,695,355 B2 | 4/2010 | Doherty | |
| 2004/0261428 A1* | 12/2004 | Murry et al. | 62/86 |
| 2007/0101756 A1* | 5/2007 | Okuda et al. | 62/402 |

FOREIGN PATENT DOCUMENTS

WO 2009080168 A1 7/2009

* cited by examiner

*Primary Examiner* — Cassey D Bauer
(74) *Attorney, Agent, or Firm* — Cantor Colburn LLP

(57) ABSTRACT

A cabin air compressor assembly includes a cabin air compressor disposed at a compressor inlet and a cabin air compressor motor operably connected to the cabin air compressor. At least one cooling flow inlet is located at a first end of the cabin air compressor motor substantially opposite a second end whereat the cabin air compressor is located. The cooling flow inlet is configured to direct a cooling flow across the cabin air compressor motor. A blower is operably connected to the cabin air compressor and is configured to urge a cooling flow from across the cabin air compressor motor toward a cooling flow outlet, thereby increasing the cooling flow across the cabin air compressor motor.

19 Claims, 2 Drawing Sheets

CABIN AIR COMPRESSOR MOTOR COOLING

BACKGROUND OF THE INVENTION

The subject matter disclosed herein relates to aircraft environmental control. More specifically, the subject disclosure relates to cooling of a cabin air compressor motor for an aircraft environmental control system.

Environmental control systems (ECS) are utilized on various types of aircraft for several purposes, such as in cooling systems for the aircraft. For example, components of the ECS may be utilized to remove heat from various aircraft lubrication and electrical systems and/or used to condition aircraft cabin air. The cabin air conditioner includes one or more cabin air compressors (CACs) which compress air entering the system, from an outside source or from a ram air system. The compressed air is delivered to an environmental control system to bring it to a desired temperature then delivered to the aircraft cabin. After passing through the cabin, the air is typically exhausted to the outside. The CACs are typically driven by air-cooled electric motors, which are cooled by a flow of cooling air typically drawn by the ram air system. The flow of cooling air and thus the performance of the electric motor and CAC is typically limited by the pressure drop from the CAC inlet to the ram air system. Such a limitation may result in reduced performance of the CAC.

BRIEF DESCRIPTION OF THE INVENTION

According to one aspect of the invention, a cabin air compressor assembly includes a cabin air compressor disposed at a compressor inlet and a cabin air compressor motor operably connected to the cabin air compressor. At least one cooling flow inlet is located at a first end of the cabin air compressor motor substantially opposite a second end whereat the cabin air compressor is located. The cooling flow inlet is configured to direct a cooling flow across the cabin air compressor motor. A blower is operably connected to the cabin air compressor and is configured to urge a cooling flow from across the cabin air compressor motor toward a cooling flow outlet, thereby increasing the cooling flow across the cabin air compressor motor.

According to another aspect of the invention, a method of cooling a cabin air compressor assembly includes providing a cabin air compressor located at a compressor inlet and a cabin air compressor motor operably connected to the cabin air compressor. A cooling flow is urged from the compressor inlet toward a first end of the cabin air compressor motor, opposite a second end whereat the cabin air compressor is located. The cooling flow is directed across the cabin air compressor motor from the first end toward the second end thus removing thermal energy from the ram air fan motor via the cooling flow. The cooling flow flows across a blower operably connected to the cabin air compressor, thus urging the cooling flow toward a cooling flow outlet.

DETAILED DESCRIPTION OF THE INVENTION

Figure 1:
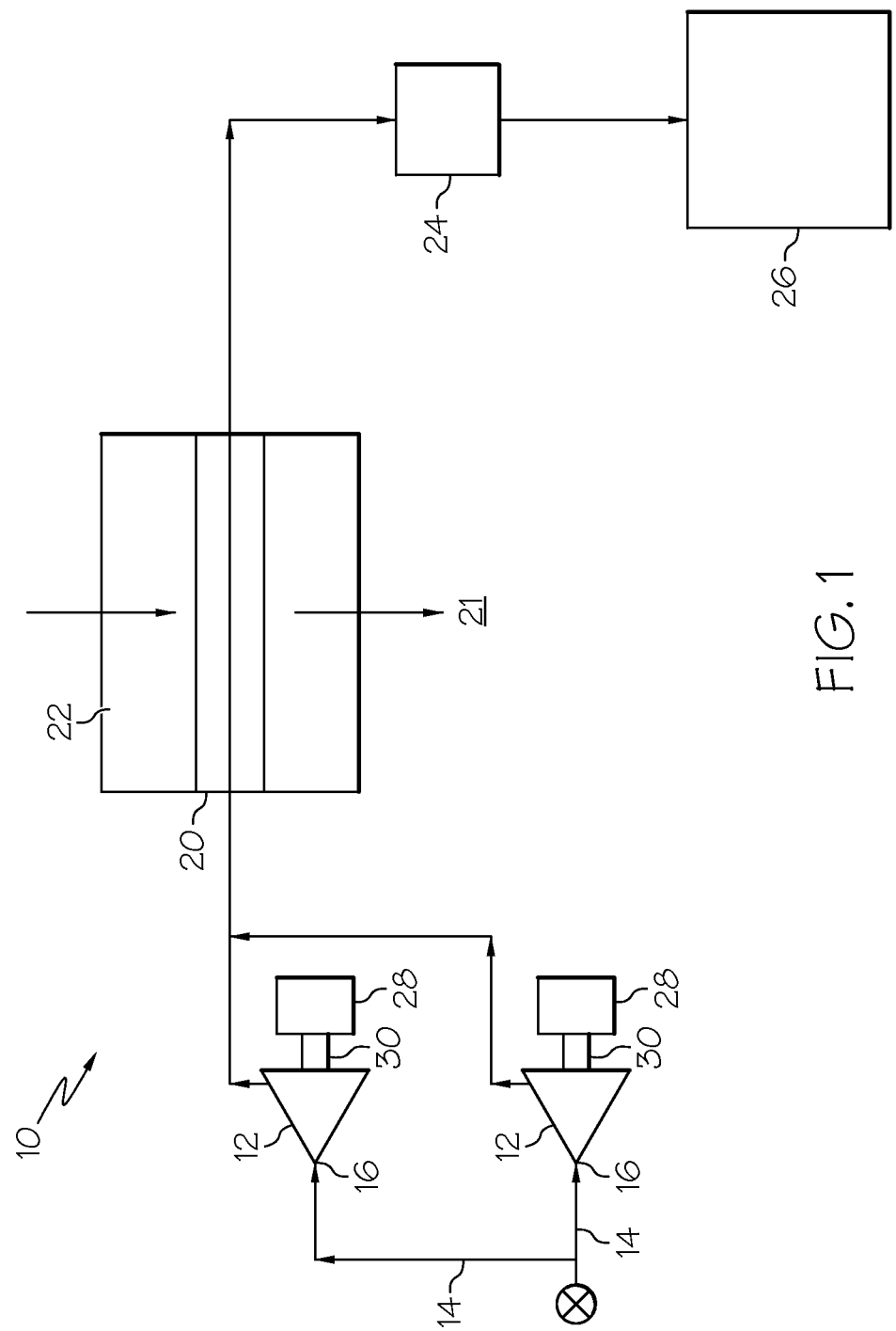
FIG. 1 is a partial schematic view of an environmental control system.

Shown in FIG. 1 is a schematic of the pertinent portion of an environmental control system (ECS) 10 for an aircraft. The ECS 10 includes one or more cabin air compressors (CACs) 12, which in some embodiments are centrifugal compressors. An outside airflow 14, or air from another source, flows into the CAC 12 at a compressor inlet 16. The CAC 12 compresses the airflow 14 and urges the airflow 14 from the compressor inlet 16 to a heat exchanger inlet 20, which in some embodiments may be part of a ram system 22, and evaporator 24 and then delivered to an aircraft cabin 26. Each CAC 12 is driven by a CAC motor 28 operably connected to the CAC 12 via a CAC shaft 30.

Figure 2:
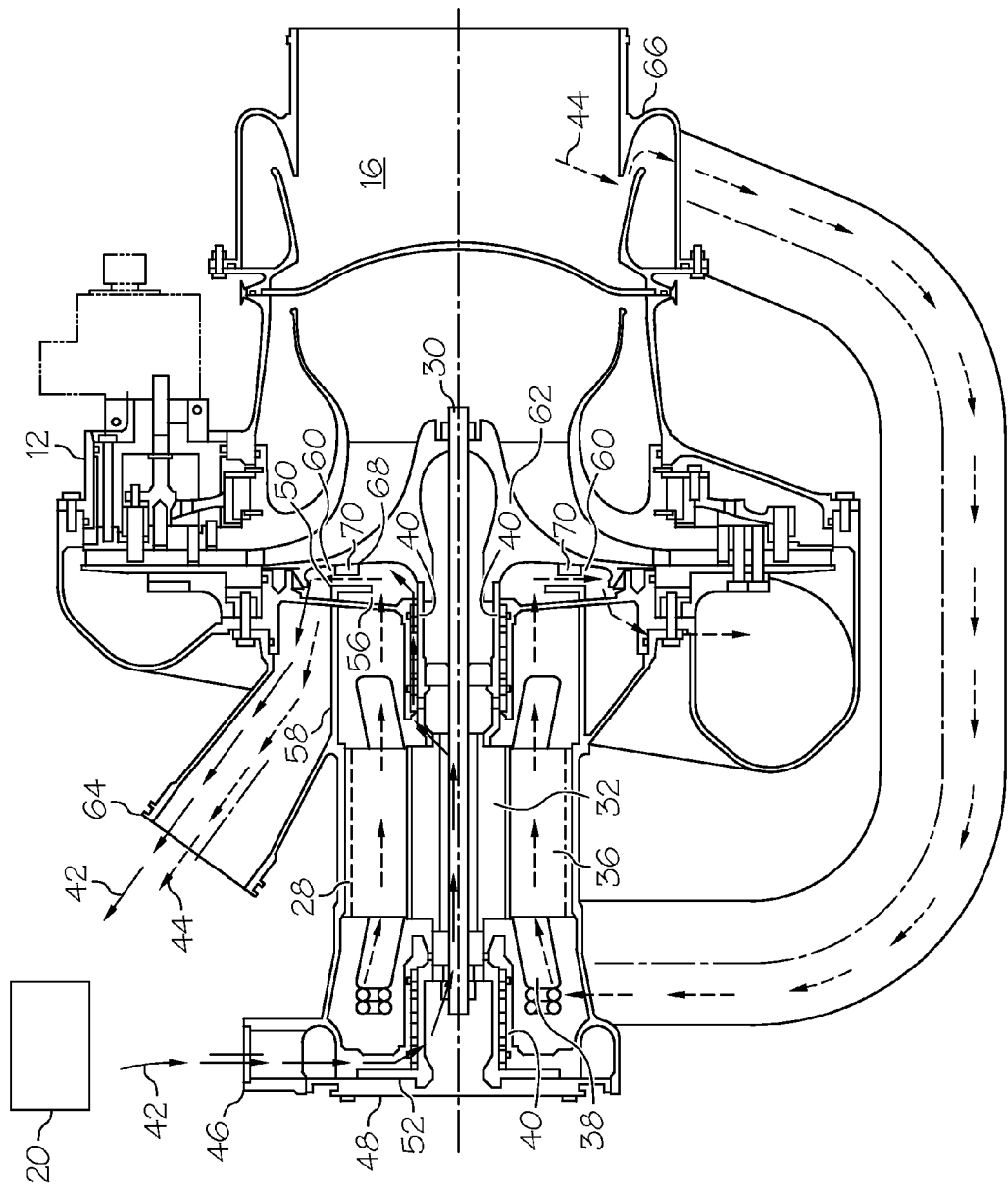
FIG. 2 is a cross-sectional view of a cabin air compressor assembly.

Referring now to FIG. 2, the CAC motor 28 is an electric motor having a rotor 32 rotatably located at the CAC shaft 30, and a stator 36 having a plurality of stator windings 38 disposed radially outboard of the rotor 32. The CAC motor 28 also includes one or more bearings 40 disposed at the CAC shaft 30. To prevent overheating of the CAC motor 28, particularly the stator windings 38 and the bearings 40, a cooling flow is drawn across the CAC motor 28. The cooling flow is driven generally by a pressure drop from the compressor inlet 16 to the ram system 22, for example, ram fan inlet 21. In some embodiments, as shown in FIG. 2, the cooling flow includes a bearing cooling flow 42 and a motor cooling flow 44. The bearing cooling flow 42 is supplied via bearing cooling inlet 46 at a first end 48 of the CAC motor 28 opposite a second end 50 at which the CAC 12 is disposed. The bearing cooling flow 42 proceeds across thrust bearings 52 located at the first end 48, and across shaft bearings 54 located, for example, at the CAC shaft 30 at the first end 48 and/or the second end 50 to remove thermal energy from the thrust bearings 52 and the shaft bearings 54. The bearing cooling flow 42 exits the CAC motor 28 at a cooling flow exit 56, which in some embodiments is defined as an opening between the CAC motor 28 and the CAC 12, providing a cooling flow outlet. In some embodiments, the CAC motor 28 includes a shroud 58 which directs the bearing cooling flow 42 radially inwardly toward the CAC shaft 30 to the cooling flow exit 56. After passing through the cooling flow exit 56, the bearing cooling flow 42 proceeds substantially radially outwardly through an exit channel 60 defined, in some embodiments, between the shroud 58 and a CAC rotor 62. The bearing cooling flow 42 is then directed to a cooling flow outlet at motor exit 64 toward, for example, the ram fan inlet 21.

The motor cooling flow 44 is drawn from the compressor inlet 16, and enters the CAC motor 28 at a motor inlet 66 at the first end 48 via a cooling conduit 68. The motor cooling flow 44 proceeds through the CAC motor 28, substantially from the first end 48 to the second end 50 removing thermal energy from the stator windings 38 and other components of the CAC motor 28. The motor cooling flow 44 then proceeds through the cooling flow exit 56, the exit channel 60 and the motor exit 64 toward, for example, the ram fan inlet 21.

A blower 68 is located in the exit channel 60 to urge the bearing cooling flow 42 and the motor cooling flow 44 outwardly through the exit channel 60. The blower 68 includes a plurality of blower blades 70 fixed to the CAC rotor 62 in the exit channel 60. In some embodiments, the blower rotor 68 is a centrifugal rotor. Since they are fixed to the CAC rotor 62, when the CAC 12 is in operation, the blower blades 70 rotate with the CAC rotor 62 about the CAC shaft 30 to urge the bearing cooling flow 42 and the motor cooling flow 44 through the exit channel 60. Inclusion of the blower 68 in the CAC 12 increases the pressure differential between the compressor inlet 16 and the ram fan inlet 21 and increases a mass flow of the bearing cooling flow 42 and the motor cooling flow 44 across the CAC motor 28. The increased pressure differential and increased mass flow increase the cooling of the CAC motor 28 thus increasing performance of the CAC 12 and the ECS 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cabin air compressor assembly comprising:
a cabin air compressor disposed at a compressor inlet;
a cabin air compressor motor operably connected to the cabin air compressor;
at least one cooling flow inlet disposed at a first axial end of the cabin air compressor motor, the cabin air compressor disposed at a second axial end, the at least one cooling flow inlet configured to direct a cooling flow across the cabin air compressor motor;
a cooling flow pathway extending from a cabin air compressor rotor inlet to the cooling flow inlet to divert the cooling flow from the cabin air compressor rotor inlet and inject the cooling flow through the at least one cooling flow inlet into the first end; and
a blower operably disposed axially between the cabin air compressor motor and a cabin air compressor rotor, the blower configured to urge a cooling flow from across the cabin air compressor motor toward a cooling flow outlet, thereby increasing the cooling flow across the cabin air compressor motor.

2. The cabin air compressor assembly of claim 1, wherein the blower comprises a plurality of blower blades affixed to the cabin air compressor rotor.

3. The cabin air compressor assembly of claim 2, wherein the plurality of blower blades extend at least partially across an exit channel defined by the cabin air compressor rotor and the cabin air compressor motor.

4. The cabin air compressor motor of claim 3, wherein the cabin air compressor rotor is a centrifugal rotor.

5. The cabin air compressor assembly of claim 1, further comprising a shroud disposed at the second axial end to direct the cooling flow toward the cooling flow outlet.

6. The cabin air compressor assembly of claim 1, wherein the at least one cooling flow inlet comprises two or more cooling flow inlets.

7. The cabin air compressor assembly of claim 6, wherein one of the two or more cooling flow inlets directs at least a portion of the cooling flow toward one or more bearings of the cabin air compressor motor.

8. The cabin air compressor assembly of claim 6, wherein another of the two or more cooling flow inlets directs at least a portion of the cooling flow toward a stator winding of the cabin air compressor motor.

9. The cabin air compressor assembly of claim 1, wherein the cabin air compressor is operably connected to the cabin air compressor motor via a shaft.

10. The cabin air compressor assembly of claim 1, wherein the at least one cooling flow inlet is configured to direct at least a portion of the cooling flow toward the cabin air compressor motor from the compressor inlet.

11. The cabin air compressor inlet of claim 1, wherein the cooling flow outlet is configured to direct the cooling flow from the cabin air compressor motor toward a ram fan inlet.

12. A method of cooling a cabin air compressor assembly comprising:
providing a cabin air compressor disposed at a compressor inlet and a cabin air compressor motor operably connected to the cabin air compressor;
diverting a cooling flow from the compressor inlet toward a first axial end of the cabin air compressor motor via a cooling flow pathway;
injecting the cooling flow from the cooling pathway into the first axial end;
directing the cooling flow across the cabin air compressor motor from the first axial end toward the second axial end, the cabin air compressor disposed at the second axial end, thus removing thermal energy from the cabin air compressor motor via the cooling flow; and
flowing the cooling flow across a blower disposed axially between the cabin air compressor motor and a cabin air compressor rotor, thus urging the cooling flow toward a cooling flow outlet.

13. The method of claim 12, wherein flowing the cooling flow across the blower comprises flowing the cooling flow across a plurality of blower blades affixed to the cabin air compressor rotor and extending at least partially across an exit channel defined by the cabin air compressor rotor and the cabin air compressor motor.

14. The method of claim 12, further comprising flowing the cooling flow past a shroud disposed at the second axial end to direct the cooling flow toward the cooling flow outlet.

15. The method of claim 12, further comprising directing at least a first portion of the cooling flow from a first cooling flow inlet toward one or more bearings of the cabin air compressor motor.

16. The method of claim 12, further comprising directing at least a second portion of the cooling flow from a second cooling flow inlet toward a stator winding of the cabin air compressor motor.

17. The method of claim 12, further comprising directing at least a portion of the cooling flow toward the cabin air compressor motor from the compressor inlet.

18. The method of claim 12, further comprising directing the cooling flow from the cabin air compressor motor toward a ram fan inlet.

19. A cabin air compressor assembly comprising:
a cabin air compressor disposed at a compressor inlet;
a cabin air compressor motor operably connected to the cabin air compressor;
a first cooling flow inlet disposed at a first axial end of the cabin air compressor assembly, the first cooling flow inlet configured to direct a cooling flow across one or more bearings of the cabin air compressor motor;
a second cooling flow inlet disposed at a second axial end of the cabin air compressor assembly opposite the first axial end, the second cooling flow inlet configured to direct a cooling flow across a stator winding of the cabin air compressor motor; and
a blower operably disposed axially between the cabin air compressor motor and a cabin air compressor rotor, the blower comprising a plurality of blades secured to a cabin air compressor rotor, the blower configured to urge a cooling flow from across the cabin air compressor motor toward a cooling flow outlet, thereby increasing the cooling flow across the cabin air compressor motor.

* * * * *